March 15, 1966  C. F. SCHORN  3,240,014

HYDRO-MECHANICAL FUEL CONTROL

Filed Nov. 14, 1962  7 Sheets-Sheet 1

INVENTOR.
CARL F. SCHORN
BY Whittemore
Hulbert & Belknap
ATTORNEYS.

March 15, 1966

C. F. SCHORN

3,240,014

HYDRO-MECHANICAL FUEL CONTROL

Filed Nov. 14, 1962

INVENTOR.
CARL F. SCHORN
BY Whittemore
Hulbert & Belknap
ATTORNEYS

March 15, 1966

C. F. SCHORN 3,240,014

HYDRO-MECHANICAL FUEL CONTROL

Filed Nov. 14, 1962

INVENTOR.
CARL F. SCHORN
BY Whittemore
Hulbert & Belknap
ATTORNEYS

United States Patent Office 3,240,014
Patented Mar. 15, 1966

3,240,014
HYDRO-MECHANICAL FUEL CONTROL
Carl F. Schorn, Troy, Mich., assignor to Holley Carburetor Company, Warren, Mich., a corporation of Michigan
Filed Nov. 14, 1962, Ser. No. 237,536
4 Claims. (Cl. 60—39.28)

The invention relates to fuel controls and refers more specifically to a simplified fuel metering device having complex fuel metering capabilities for use with turbine engines or similar structures.

Prior fuel controls having complex capabilities, that is, capable of metering fuel to turbine engines or the like in accordance with a plurality of variable engine parameters have been relatively complicated. Thus prior fuel controls have been relatively large and heavy and sometimes unreliable so that they are unsuitable for many uses where a less complicated, smaller, lighter, more reliable fuel control is a requisite.

It is therefore one of the purposes of the present invention to provide an improved fuel control having complex capabilities and maximum flexibility which lends itself to individual component presetting.

Another object is to provide a fuel control having a computer section isolated from the main fuel metering section.

Another object is to provide a fuel control as set forth above wherein the main fuel metering section is removable and interchangeable with fuel metering sections of different sizes to vary the capacity of the fuel control in accordance with the equipment with which it is used.

Another object is to provide a fuel control as set forth above wherein contamination of the computer section by fuel flowing through the main fuel metering section is eliminated.

Another object is to provide a fuel control as set forth above wherein the computer section includes an integral variable stroke servo supply pump.

Another object is to provide a fuel control as set forth above including means for metering fuel to a turbine engine or similar device in accordance with engine compressor output pressure or burner input pressure, engine speed and either compressor inlet pressure or compressor inlet temperature during engine acceleration.

Another object is to provide a fuel control as set forth above including means for metering fuel to a turbine engine or similar device in accordance with engine compressor output pressure or burner input pressure, engine speed, either compressor inlet pressure or compressor inlet temperature and fuel control speed set lever angle during steady state engine operation.

Another object is to provide a fuel control as set forth above including means for metering fuel to a turbine engine or similar device solely in accordance with compressor output pressure or burner input pressure during engine deceleration.

Another object is to provide a fuel control as set forth above including means for varying fuel metered to a turbine engine thereby during water injection to the engine.

Another object is to provide a fuel control as set forth above including means for controlling the metering of fuel to a turbine engine therefrom in accordance with both compressor inlet pressure and compressor inlet temperature during steady state engine operation.

Another object is to provide a fuel control for metering fuel to turbine engines and the like which is simple in construction, economical to manufacture and efficient in use.

Other objects and features of the invention will become apparent as the description proceeds, especially when taken in conjunction with the accompanying drawings, illustrating preferred embodiments of the invention, wherein.

With particular reference to the figures of the drawings one embodiment of the present invention will now be considered in detail.

Figure 1:
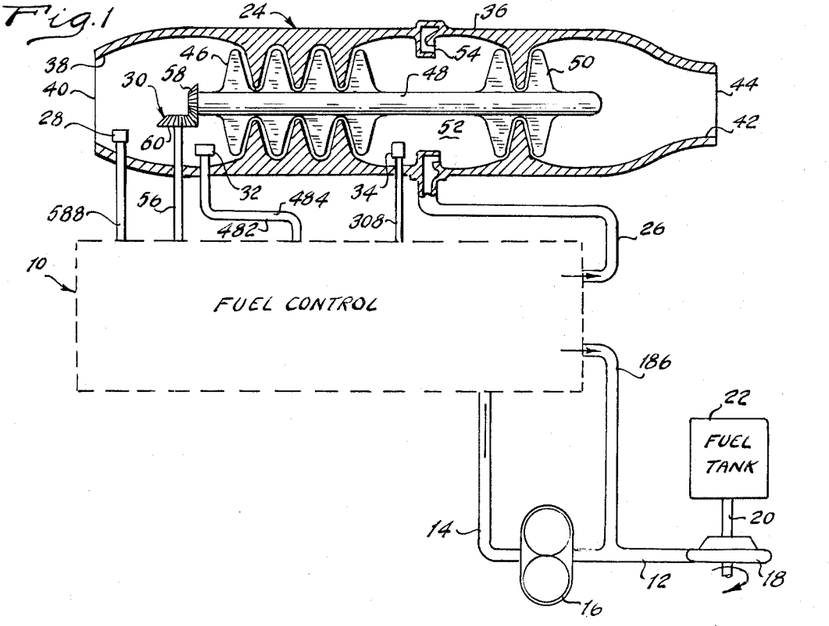
FIGURE 1 is a diagrammatic illustration of a gas turbine engine having a fuel supply system connected thereto including a fuel control constructed in accordance with the invention.

As shown best in FIGURE 1 the fuel control 10 of the invention is positioned between the input and output conduits 12 and 14 respectively of a gear pump 16 which gear pump 16 is connected through input conduit 12, centrifugal pump 18 and conduit 20 to the fuel tank 22. Fuel control 10 meters fuel to turbine engine 24 through fuel conduit 26 in accordance with a plurality of sensed engine parameters.

As shown in FIGURE 1 the engine parameters sensed by the fuel control 10 includes engine compressor input pressure sensed by compressor input pressure sensing means 28, engine speed as sensed by engine speed sensing means 30, compressor input temperature as sensed by compressor input pressure sensing means 32 and compressor output pressure or burner input pressure as sensed by pressure sensing means 34.

In operation of the engine 24 illustrated in FIGURE 1, fuel is metered thereto during acceleration from the fuel control 10 in accordance with compressor discharge or burner input pressure, engine speed and compressor input pressure. Further, during steady state engine operation fuel is metered to the engine 24 through the fuel control 10 in accordance with the same parameters and in accordance with the angular position of the control speed set lever while during deceleration fuel is metered to the engine 24 in accordance with compressor output or burner input pressure only. Fuel flow is plotted against engine speed for each of the maximum, steady state and minimum engine operating conditions in FIGURE 2.

More specifically the turbine engine 24 includes the generally cylindrical shell 36 having an air intake opening 38 at end 40 thereof and an exhaust opening 42 at end 44 thereof. The compressor 46 is rotatably mounted in the shell 36 on drive shaft 48 which is connected to turbine 50 for rotation thereby. Burner chamber 52 is provided in the shell 36 between the compressor 46 and turbine 50 into which fuel is fed through fuel feed nozzles 54 connected to fuel conduit 26.

In operation of the turbine engine 24 air is drawn through the air intake opening 38 on rotation of compressor 46. The pressure and temperature of intake air are sensed by the pressure sensing means 28 and temperature sensing means 32. The air drawn in through air intake 38 is then compressed on rotation of the compressor 46 and fed into the burner chamber 52 where the air pressure is sensed by the pressure sensor 34. Fuel is fed into the burner chamber 52 through fuel feed nozzles 54, is mixed with the compressed air from compressor 46 and ignited to drive turbine 50 which in turn drives the compressor 46 through shaft 48. The products of the combustion in burner chamber 52 are discharged through the exhaust opening 42 in the end 44 of shell 36. The speed of rotation of the turbine 50 and compressor 46 is sensed by speed sensor 30 due to the coupling of the shaft 56 thereof to the drive shaft 48 by convenient means such as bevel gears 58 and 60.

It will be understood that such turbine engine operation is conventional and that the pressure, temperature and speed sensors illustrated in FIGURE 1 in conjunction therewith are also conventional except as described hereinafter. Further in the discussion of the fuel control 10 that follows, it will be understood that engine parameters other than those sensed by the sensing means illustrated in FIGURE 1 may be used to control the fuel metered to the turbine engine. Also, the fluid metering principles of the fuel control 10 may be used in conjunction with other sensing means than those illustrated. Therefore, the invention is not to be construed as limited by the sensing means shown for illustrative purposes.

Figure 3:
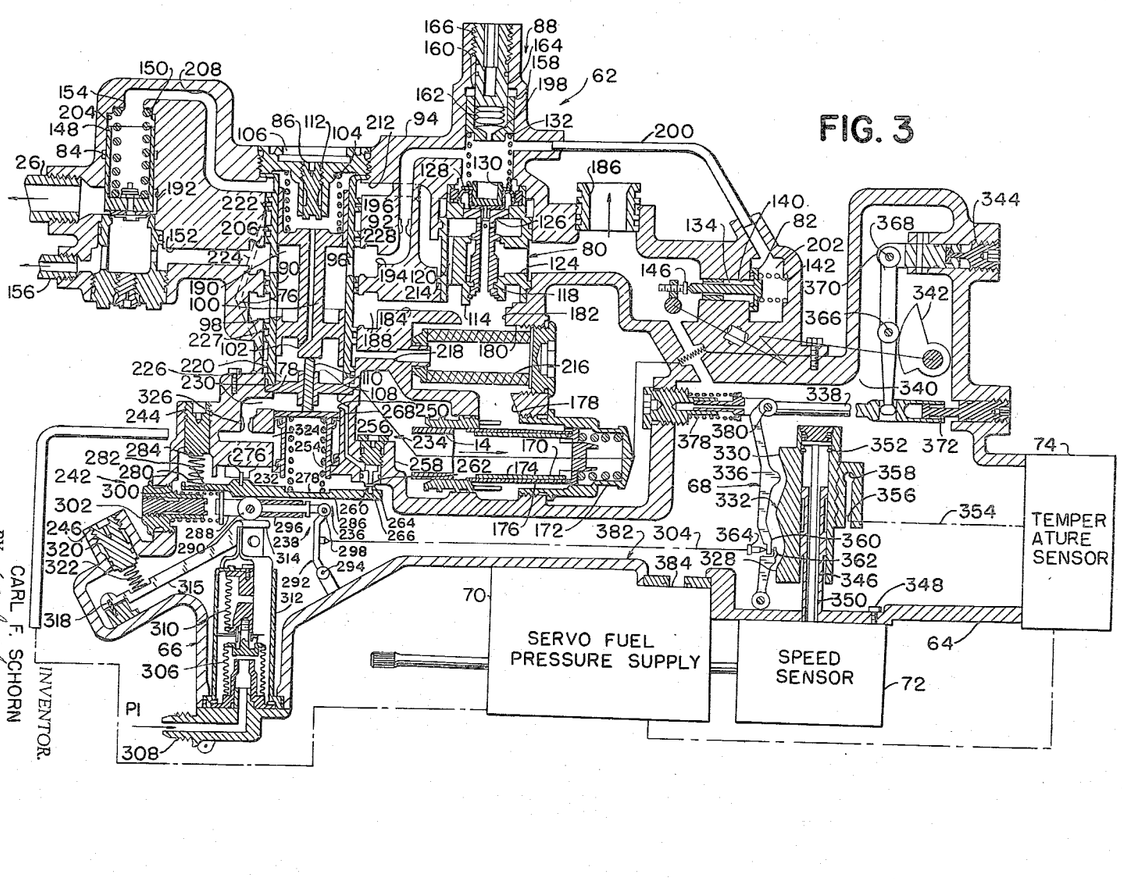
FIGURE 3 is a diagrammatic illustration of the fuel control illustrated in FIGURE 1.
Figure 3A:
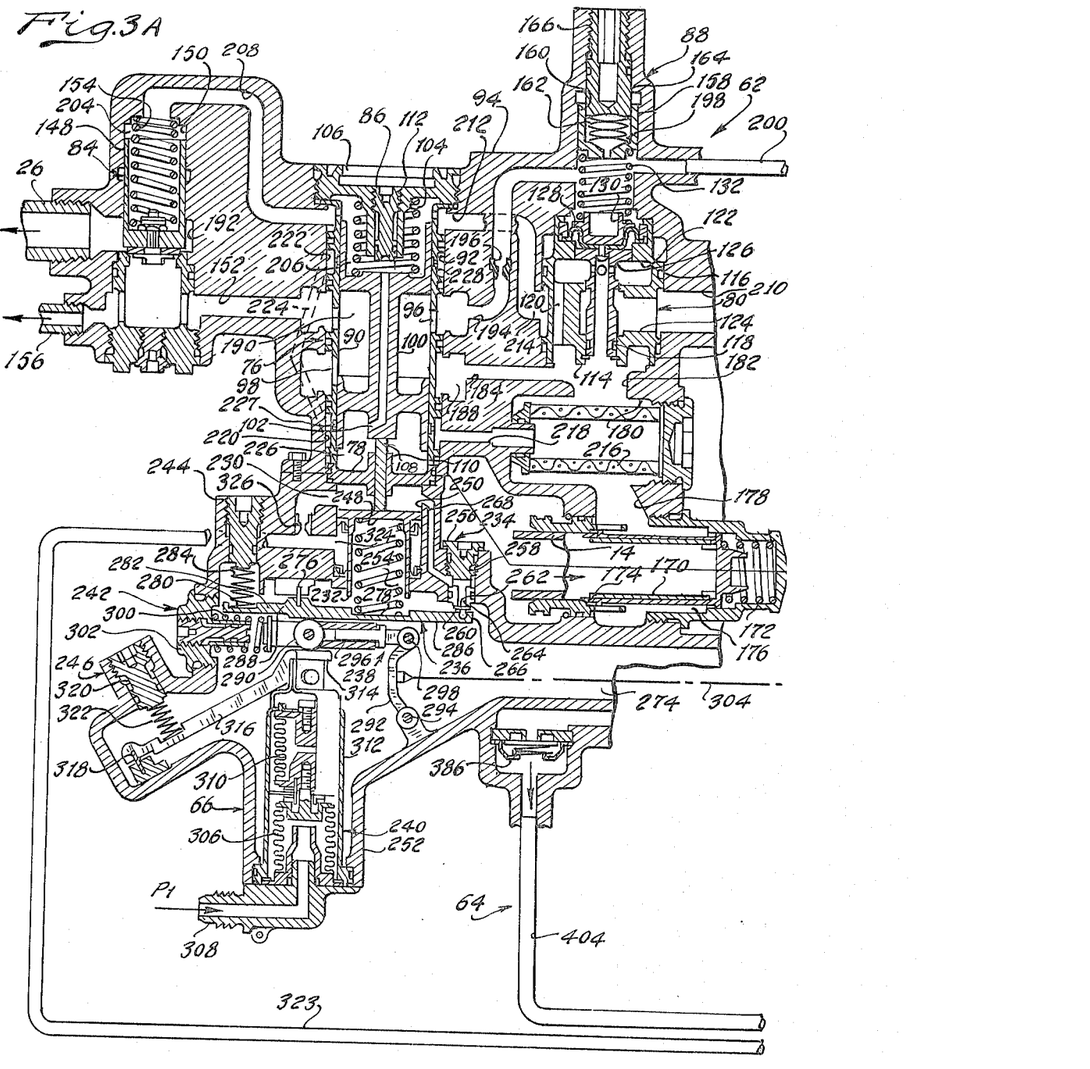
FIGURES 3A, 3B and 3C are enlarged diagrammatic illustrations of the fuel control illustrated in FIGURE 3.
Figure 3B:
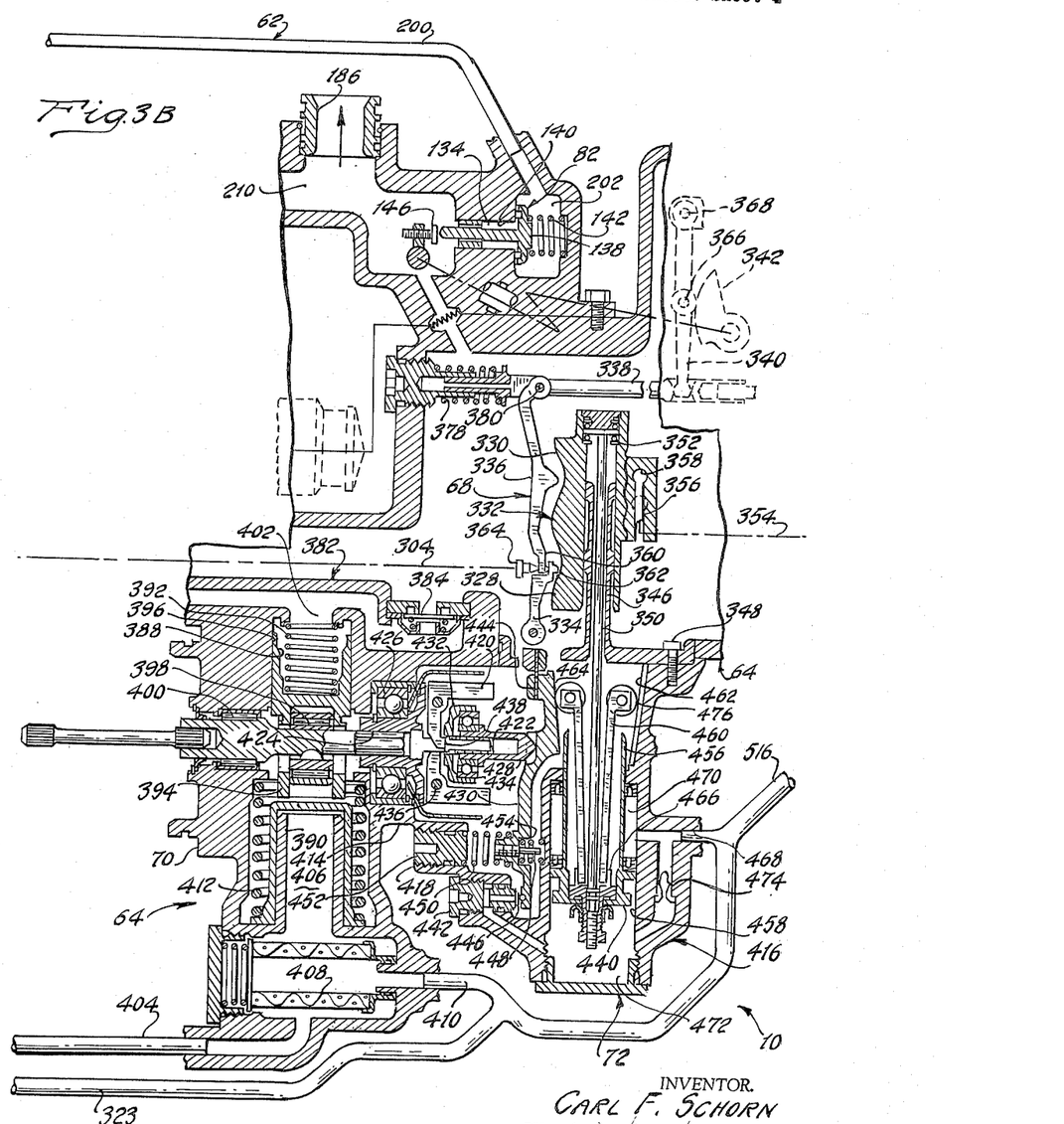
Figure 3C:
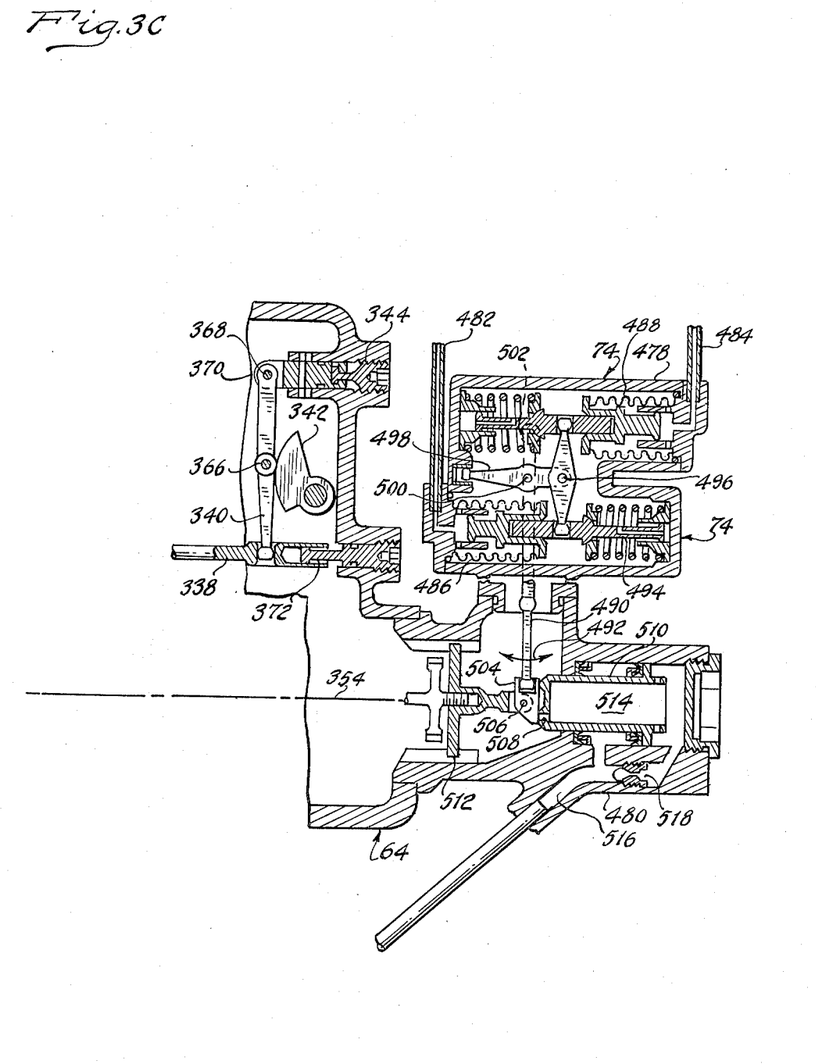

Fuel control 10, as shown best in FIGURES 3A, 3B and 3C includes a main fuel metering section 62 and a computer section 64. The computer section 64 of the fuel control 10 includes a primary control signal pressure portion 66, a governing and acceleration control portion 68, a servo fuel pressure supply portion 70, speed sensor portion 72 and temperature sensor portion 74.

The main fuel metering section 62 of the fuel control 12 includes the main fuel metering valve assembly 76, fuel bypass valve assembly 80, poppet servo valve assembly 82 and main fuel metering shut-off valve assembly 84. Minimum fuel flow adjusting stop 86 and fuel temperature and density compensating structure 88 are also included as a part of the main fuel metering section 62.

The main fuel metering section 62 is substantially independent of the computer section 64 and in the fuel control 10 is a separate unit which is removably secured by convenient means such as bolts to the computer section 64. The main fuel metering section 62 is therefore replaceable with main fuel metering sections having greater or less fuel metering capacity in accordance with the structure with which the fuel control 10 is used. Maximum flexibility of the fuel control 10 is thus accomplished through the use of variable size main fuel metering section 62 under the control of a single computer section 64.

The main fuel metering valve assembly 76 comprises a sleeve 90 inserted in an opening 92 in the housing 94. Sleeve 90 has openings 96 and 98 extending transversely therethrough, as shown in FIGURE 3A, and slidably receives the valve member 100 therein for axial movement with respect thereto. Valve member 100 is cylindrical and is shaped as shown best in FIGURE 3A. A passage 102 extends through the central portion of valve member 100 to provide equal pressures at opposite ends of the valve member 100. The valve member 100 is urged toward the end 78 of opening 92 by spring 104 operable between the valve member 100 and the retaining cap 106 for sleeve 90 threaded into the housing 94.

Valve member 100 is moved axially of sleeve 90 in accordance with the position of the push rod 108 axially of its bearing 110. The flow area through the valve assembly 76, that is the flow through opening 98 in sleeve 90, as regulated by the axial position of the valve member 100, is constructed to be proportional to axial valve travel.

Minimum fuel flow through the valve assembly 76 is established by the axial position of the adjustable stop 86 threaded in the cap 106 which abuts the valve member 100 and establishes the minimum fuel flow limiting position thereof.

The fuel bypass valve 80 includes the outer sleeve 114 secured in a fixed axial position within opening 116 in housing 94 having the axially extending passages 118 and 120 therein. Sleeve 114 also includes the annular interior groove 122 and the transversely extending opening 124. The generally cylindrical valve member 126 is movable axially of the sleeve 114 and is supported thereon by the diaphragm 128 and clamping member 130. Valve member 126 is urged into a bypass valve closing relation to the sleeve 114 by means of the spring 132 acting between the fuel density compensating structure 88 and the clamping member 130. The fuel bypass valve assembly 80 operates to provide a constant pressure differential across the main metering valve assembly 76.

The poppet servo valve 82 includes the guided valve stem 134, valve member 138 secured thereto for movement therewith axially of passage 140 in housing 94 into opening and closing relation to the passage 140. The valve member 138 is urged into closing relation to the passage 140, as shown in FIGURE 3B, by spring 142. The valve member 138 may be moved to an open position by sufficient pressure differential thereacross or on turning of the fuel control speed set lever 144 to an engine shut-down position at which time the adjustable abutment 146 secured to the lever 144 contacts the shaft 134 of the valve 82 to hold the valve member 138 in an open position in opposition to the bias applied thereto by the spring 142.

The main fuel metering shut-off valve assembly 84 includes the valve piston 148 positioned in opening 150 in housing 94 and movable axially therein in opening and closing relation with respect to the fuel flow passage 152 between the main fuel metering valve assembly 76 and the fuel conduit 26 through which fuel is passed to the fuel nozzles 54 of turbine engine 24. The piston 148 is urged into a closed position with respect to passage 152 by spring means 154. Conduit 156 is a pressure sensing line for actuation of a remote engine fuel dump valve (not shown).

Fuel temperature and density compensating structure 88 includes a piston cup 158 slidably mounted in opening 160 in housing 94 and a plurality of bi-metal discs 162 positioned within and in engagement with the bottom of the cup 158 and the end 164 of the adjustable abutment 166. The discs 162 operate to vary the bias on the valve member 126 of the fuel bypass valve assembly 80 in accordance with the temperature of fuel surrounding the discs. Abutment 166 is adjusted axially to provide the same bias for fuels of different density.

Thus the constant pressure provided across the main fuel metering valve 76 is varied by the bypass valve 80 in accordance with fuel temperature and density.

In operation of the fuel control 10 the fuel flow through the main fuel metering section 62 is through the fuel inlet conduit 14 through the cylindrical screen filter 170 which is biased into the position shown in FIGURE 3A by spring 172 when the screen is not clogged and which moves to the right in FIGURE 3A to permit passage of fuel around end 174 of the filter under fuel inlet pressure when the screen 170 is clogged with material filtered from the inlet fuel. Fuel passing through or around the filter 170 enters the annular chamber 176 and proceeds through passage 178 into the annular chamber 180. From the annular chamber 180 the main metered fuel passes through passage 182 where it is divided between fuel metered to the engine 24 through passage 184 and that bypassed to the pump return conduit 186 connected to the conduit 12 on the input side of the gear pump 16, as shown in FIGURE 1, through bypass valve 80.

The fuel passing through conduit 184 empties into the annular chamber 188 and enters chamber 190 formed by sleeve 90 and valve member 100 of fuel metering valve assembly 76. The fuel in chamber 190 then passes through fuel conduit 152, past the main fuel metering shut-off valve assembly 84 into annular chamber 192 and to the engine fuel conduit 26.

Fuel from chamber 190 is also passed through conduit 194 having restriction 196 therein to the chamber 198 at the top of the fuel bypass valve assembly 80 and then through conduit 200 into chamber 202 in which the valve member 138 of the poppet valve assembly 82 is positioned. Chambers 204 on one side of the main fuel metering shut-off valve assembly 84 and chamber 206 at the upper end of the main fuel metering valve 100 are connected together through fuel conduit 208 and are further connected to the pump return chamber 210 through conduit 212 and annular chamber 214 around sleeve 114 of the fuel bypass valve assembly 80.

In addition, coarse filtered fuel from chamber 180 is again filtered through the fine cylindrical filter 216 and through passage 218 to annular passages 220 and 222 connected by means of passage 224. The fine filtered fuel is then passed to annular passages 227 in sleeve 90 through openings 228 to wash the valve member 100.

When it is desired to shut down the engine 24 the fuel control speed set lever 144 is rotated to an engine shut-down position wherein the abutment 146 engages the stem 134 of poppet valve assembly 82 to open the passage 140 and cause the pressure in chamber 198 which is normally maintained at substantially the metered fuel pressure found in conduit 194 in the main fuel metering valve assembly 76 to go to the substantially lower high return pressure in chamber 210. Due to the unbalanced forces acting on diaphragm 128 of fuel bypass valve 80 on lowering of pressure in chamber 198 the valve member 126 of fuel bypass valve 80 will be caused to move in an upward direction, as shown in FIGURE 3A, to open the fuel bypass valve sufficiently to dump the fuel in chamber 180 into chamber 210 and substantially lower the metered fuel pressure in the chamber 190 of the main fuel metering valve assembly 76 and therefore the pressure in conduit 152. The spring bias of the fuel shut-off valve assembly 84 will then cause the fuel shut-off valve piston 148 to close the fuel conduit 152 to shut-off fuel metered to the engine 24. The lower fuel pressure in conduit 152 is also sensed in conduit 156 to provide actuation of the remote engine fuel dump valve.

The primary control signal pressure portion 66 of the computer section 64 of the fuel control 10 comprises a slave piston mechanism 232, servo valve assembly 234, control signal ratio lever structure 236, control signal transfer mechanism 238 and bellows structure 240. The minimum signal pressure to fuel flow ratio adjusting mechanism 242, signal pressure to fuel flow ratio lever bias adjusting structure 244 and the primary control signal pressure bias adjusting structure 246 are also included in the primary control signal pressure portion of the computing section 64 of the fuel control 12.

The slave piston mechanism 232 includes the generally cylindrical cup shaped piston member 248 slidably received for axial movement within the opening 250 in housing portion 252. Spring 254 operates between the ratio lever 236 and the bottom of piston 248 to urge the piston into contact with the push rod 108 extending through the bearing 110. The push rod 108 is thus in engagement with both the slave piston 248 and the main fuel metering valve member 100 whereby the position of the main fuel metering valve member 100 is determined by the position of the slave piston 248.

Servo valve structure 234 includes the valve seat member 256 secured within opening 258 in housing 252 having a valve seat 260 at the inner end thereof defining a circular valve orifice 262. Servo valve 234 further includes the valve member 264 pivotally secured to the end 266 of the ratio lever 236 for movement toward and away from the valve seat member 256. Flow of fluid through the servo valve 234 is thus from the passage 268, past the valve member 264 and into the low return pressure chamber 274.

The signal ratio lever structure 236 includes the ratio control lever 286 which is pivotally secured to the housing 252 by the flat spring 276. Lever 286 carries at its end 266 the valve member 264, as previously indicated, and is provided with recesses 278 and 280 on the side 282 thereof for receiving the spring 254 of the slave piston mechanism and spring 284 of the ratio lever bias adjusting structure 244. Lever 286 is further provided with a roller surface on the side 288 along which the roller 290 of the control signal transfer mechanism 238 is moved.

The control signal transfer mechanism 238 includes the linkage 292 pivoted to the housing portion 252 by pivot means 294 at one end and to the member 296 supporting roller 290 by pivot means 298 at the other end. Member 296 is urged toward the right in FIGURE 3A by the spring 300 abutting the member 290 at one end and the adjustable plug 302 of the minimum signal pressure to fuel flow ratio adjusting mechanism 242 at the other end. The axial position of the member 296 and therefore the position of the roller 290 along the lever 286 is a function of cam lift imparted to the linkage 292 through force transfer rod 304 of the governing and acceleration portion 68 of the computing section 64 of the fuel control 10.

Bellows structure 240 includes the bellows 306 connected through conduit 308 of the compressor output pressure or burner input pressure of the engine 24, as sensed by the pressure sensor means 34 which is the primary control signal pressure in the fuel control 10 illustrated in FIGURE 3A. The bellows structure 240 further includes the sealed bellows 310 and the force transfer member 312 connected between the bellows 306 and 310. Bellows 310 has the same effective area as bellows 306 and is provided to counterbalance the effect of any changes in pressure in chamber 274 on bellows 306. Thus in operation upon a variation of the primary control signal pressure in bellows 306 the force applied to ratio lever 286 through roller 290, the end 314 of the primary control signal pressure bias lever 316 and the force transfer member 312 will be varied in accordance with the direction of change thereof.

The primary control signal pressure bias adjusting structure 246 includes the lever 316 pivotally mounted on the flat spring pivot means 318 mounted on housing portion 252, the axially adjustable bias adjusting abutment 320 and the bias spring 322 operable between the abutment 320 and lever 316. The force exerted by the force transfer member 312 of the bellows structure 240 due to a particular primary control signal pressure will be varied in accordance with the position of the abutment 320 and the resulting bias on the lever 316 due to the spring 322.

In operation of the primary control signal pressure portion of the computer section of the fuel control 10 fuel under constant pressure from the servo fuel pressure supply system 70 is transmitted to chamber 324 surrounding the slave piston 248 through conduit 323 from which the fuel is transferred into chamber 230 at the top of the slave piston, as illustrated in FIGURE 3A, through the restriction 326. The pressure drop across the restriction 326 is varied in accordance with the opening of the servo valve assembly 234 and the low return pressure in the chamber 274 of the computing section 64 of the fuel control 10 to vary the pressure differential across the slave piston 248 to produce movement thereof and consequent similar movement of the valve member 100 of the fuel metering valve 76.

The lever 286 is caused to rotate about the pivot means 276 to vary the position of the valve member 264 of the servo valve assembly 234 in accordance with the forces applied thereto by the spring 254 and the roller 290 since the spring 284 may be considered only as a constant bias which may be subtracted from the force applied to the lever 286 by the spring 254.

Thus the force balance equation on signal ratio lever 286 may be written as $$P_1 \times A = \frac{F_s L_1}{L_2} \quad (1)$$

wherein $P_1$ is equal to the primary control signal pressure, A is equal to the area of the bellows 306, $F_s$ is the spring force of spring 254, $L_1$ is the distance between the pivot member 276 and the center line of the spring 254 and $L_2$ is the distance between the pivot member 276 and the point of contact of the roller 290 with lever 286. In addition it will be recognized that the force due to the spring 254 is equal to the spring rate times the travel of the valve member 100 of the main fuel metering valve assembly 76 or slave piston 248 or $$F_s = K_s \times VT \quad (2)$$

Thus since the flow area of the main fuel metering valve assembly 76 is made proportional to valve travel and the pressure drop across the flow area is held constant by the bypass valve assembly 80, fuel flow through the main fuel metering valve assembly 76 is a function of valve travel or $$VT = \frac{W_f}{f_1} \quad (3)$$

and $$F_s = K_s \frac{W_f}{f_1} \quad (4)$$

whereby on performing the necessary substitutions in Equation 1 the following equation results:

$$\frac{W_f}{P_1} = \frac{A f_1 L_2}{K_s L_1} \quad (5)$$

and since each of the terms A, $f_1$, $l_1$, and $K_s$ are constant, the following equation results:

$$L_2 = f_2 \frac{W_f}{P_1} \quad (6)$$

From the above it will be apparent that the acceleration portion 328 and the governor portion 330 of cam 332 in the governing and acceleration control portion 68 of the computing section 64 of the fuel control 10 which operate to move the force transfer rod 304 axially may be constructed to produce a given $L_2$ distance for a given ratio of fuel flow with respect to primary control signal pressure, $W_f/P_1$. Further from the above it will be seen that if the distance $L_2$ is held constant that fuel flow through the main fuel metering valve assembly 76 will be directly proportional to $P_1$ in accordance with the equation $$W_f = f_3 P_1 \quad (7)$$

In other words the fuel control 12 is constructed so that the fuel metered to the turbine engine 24 will be in accordance with the ratio $W_f/P_1$ at all times and the ratio may be varied in accordance with the contours of the acceleration portion 328 and governing portion 330 of the cam 332.

The governing and acceleration control portion 68 of the computing section 64 of the fuel control 10 comprises the cam 332, acceleration lever 334, the force transfer rod 304 previously considered, governor lever 336, governor lever adjusting linkage 338, and speed set cam follower lever 340. The speed set cam 342 and the turbine overspeed adjustment structure 344 are also included in the governing and acceleration control portion 68 of the fuel control computing section 64.

Cam 332 is slidably mounted on the tubular guide 346 secured to housing 252 by convenient means, such as bolts 348 for axial movement with respect thereto. Axial movement of the cam 332 is accomplished in accordance with the position of the rod 350 of the computer section speed sensor portion 72 which rod extends through the tubular guide 346 and is connected to the cam 332 between thrust bearings 352. The cam 332 is fixed axially with respect to the shaft 350 but is rotatable relative thereto. Cam 332 is rotatable in accordance with the axial movement of force transfer rod 354 of the computer section temperature sensor portion 74. The end 356 of the rod 354 is terminated in a ball portion held within the complementary slot 358 in the cam 332. Thus, it will be seen that the cam 332 is movable axially of guide member 346 in accordance with engine speed and is rotatable about guide member 346 in accordance with temperature, such as compressor input temperature as sensed by sensing device 32 illustrated in FIGURE 1.

The end 360 of the governor lever 336 is pivotally positioned on the end 362 of the acceleration lever 334 while the end 364 of the force transfer rod 304 is abuted against the end 360 of the governor lever 336.

Figure 2:
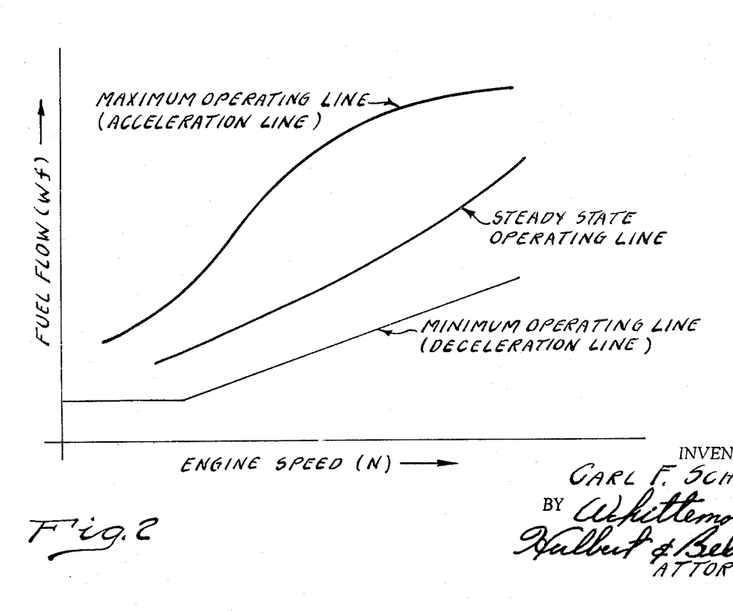
FIGURE 2 is a graph illustrating generally the relation of fuel flow to engine speed for the system illustrated in FIGURE 1 for acceleration, steady state and deceleration engine operation.

During engine acceleration the accelerating lever 334 is in contact with the acceleration portion 328 of the cam 332 to control the position of the force transfer rod 304 and therefore the position of the roller 290 on the ratio lever 286 to vary the fuel flow to primary control signal pressure ratio in accordance with the acceleration schedule indicated in FIGURE 2. At this time the governor lever 336 is not in contact with the governor portion 330 of the cam 332.

In contrast during steady state engine operation the cam surfaces 328 and 330 are contoured so that the governor lever 336 is in contact with the governor cam portion 330 while the acceleration lever 334 is held out of contact with the acceleration cam portion 328. Thus during steady state operation of the turbine engine 24 the position of the force transfer rod 304 is determined by the governing cam portion 330 of the cam 332 and the distance $L_2$ is adjusted by axial movement of the roller 290 along ratio lever 286 to provide a predetermined steady state fuel flow to primary control signal pressure ratio, as shown in the steady state operation schedule of FIGURE 2.

As previously indicated during steady state operation of engine 24 the fuel flow to the engine is also a function of the fuel control speed set lever position or angle so that the steady state operating condition may be varied manually. Thus the speed set cam 342 which is rotated in accordance with the angular position of the speed set lever 144 is provided in engagement with the cam follower 366 on the speed set cam follower lever 340 which is pivotally mounted on pivot means 368 at end 370 thereof. On rotation of the lever 144 the axial position of the governor lever adjusting linkage 338 which is guided on the idle adjustment abutment 372 and is biased to the right in FIGURE 3B by spring means 378 is varied to vary the position of the pivotal mounting 380 of the governor lever 336.

As will be understood the axially adjustable idle adjustment abutment 372 provides a stop on the movement to the right of the pivotal mounting 380 of governor lever 336 whereat sufficient fuel is metered to the engine 24 to sustain idle operation thereof. Similarly the axially adjustable pivot mounting 368 of end 370 of the cam follower lever 340 is provided to establish maximum fuel flow to the engine 24 through the fuel control 10 to prevent turbine overspeed and possible damage.

The servo fuel pressure supply system 70 of the computing section 64 of the fuel control 10 comprises a variable volume constant pressure pump 382 including inlet check valve 384, outlet check valve 386, pumping piston 388 biased toward the accumulator hat member 390 by spring means 392 and including a bifurcated end 394 engageable therewith. In operation of the pump 382 the pumping piston 388 is reciprocated within the opening 396 by means of the eccentric 398 keyed to the pump shaft 400 which is driven through rod 56 at a speed proportional to engine speed. Thus in the downward stroke of the piston 388, as shown in FIGURE 3B, fuel is drawn from the low return chamber 274 through the check valve 384 into chamber 402 and on the pumping stroke of the piston 388 is forced through the check valve 386 into conduit 404 and into chamber 406.

Fuel in chamber 406 is filtered through filter 408 and passed into conduit 410. The fuel in conduit 410 is maintained at a substantially constant pressure since as the pressure in chamber 406 increases beyond a predetermined amount the accumulator hat 390 is caused to move up in FIGURE 3B toward the pumping piston 388 in opposition to the bias spring 412. The accumulator hat 390 thus engages the bifurcated end 394 of the pumping piston 388 and moves the pumping piston upward in FIGURE 3B out of engagement with the eccentric 398 during a portion of the rotation of the shaft 400 to reduce the pumping stroke of piston 388 and therefore the volume of the pump 382.

The speed responsive portion 72 of the computer section 64 of the fuel control 10 comprises the centrifugal flyweight mechanism 414 and the servo mechanism 416 and bias means 418 therefor.

The flyweight mechanism 414 includes the centrifugal flyweights 420 rotatably mounted on extension 422 of shaft 400 by means of supporting member 424 sleeved over the extension 422 and rotatably mounted in bearing 426. Flyweight mechanism 414 further includes the abutment member 428 engageable with the lever 430 of the servo mechanism 416 and mounted for axial movement and relative rotation on shaft extension 422 in cup 432 and bearing 434.

In operation with the shaft 400 turning at a speed proportional to engine speed the flyweights 420 are caused to pivot about pivot means 436 to move the ends 438 into engagement with the cup 432 whereby the abutment member 428 is moved axially with a force in accordance with engine speed squared.

Movement of the lever 430 of the servo mechanism 416 controls movement of the differential area piston 440 in accordance with the opening of the poppet valve assembly 442. As shown the lever 430 is pivotally connected to the housing portion 252 by the flexible metal strap 444 and carries the poppet valve assembly valve member 446 at the opposite end thereof. The response of the servo mechanism 416 to a particular engine speed sensed by the centrifugal mechanism 414 is controlled by the bias means 418 in accordance with the force applied to the lever 430 by means of oppositely acting springs 448 and 450 as regulated by the adjustment of the adjustable plug 452. The maximum movement of lever 430 due to sensed speed of the turbine engine 24 is fixed by the position of the adjustable abutment 454.

The differential area piston 440 includes the cylindrical cup shaped piston member 456 movable axially within the bore 458 in the housing 252. The piston 456 carries therewith the roller supporting members 460 which move the rollers 476 along the fixed abutment 462 in housing portion 252 and the variably positioned surface 464 of lever 430. The members 460 are spring members biasing the rollers 476 into engagement with surface 464 and abutment 462. The members 460 exert no outward force when the rollers are adjacent the pivot point of lever 430. Members 460 are rotatably mounted at the ends opposite the rollers 476 so that the rollers will not bind as they move along the surface 464.

In operation the constant pressure in conduit 410 is fed to conduit 468 of the servo mechanism 416 so that the constant pressure is applied in the chamber 470 while a reduced pressure is present in chamber 472 due to a pressure drop across the fixed restriction 474. The flow through chamber 472 and therefore the pressure drop across orifice 474 is controlled by the servo valve mechanism 442 in accordance with the position of the speed responsive lever 430. The position of the differential area piston mechanism 440 and thus the axial position of the cam 332 thus is determined by the forces acting on the lever 430 due to the centrifugal flyweight mechanism 414 and the force with which roller 476 engages the surface 464. The net effect of the rate of spring members 460 and angle of lever 430 is to provide a torque on the lever which is a function of the square of the roller position from the lever pivot. Since the flyweight force varies as a function of speed squared, the result is a travel of cam 332 which varies as a straight line function of speed. The straight line function can be varied by changing the roller support surfaces to curved surfaces.

With the differential area piston mechanism 440 in a predetermined position as the speed of the turbine engine 24 increases the force applied to lever 430 through abutment member 428 will cause the lever 430 to pivot counterclockwise about pivot means 444 to more fully open servo valve 442. Opening of servo valve 442 will cause a reduction in pressure in chamber 472 and consequent downward movement of piston 456, rod 350 and cam 332.

Downward movement of piston mechanism 440 will continue until the force applied to lever 430 through roller 476 is applied at a sufficient distance from pivot means 444 to pivot the lever 430 clockwise to close servo valve 442 and reestablish a higher pressure in chamber 472 to balance the pressures on the opposite sides of the differential area piston mechanism 440. Thus it will be seen that cam 332 is moved axially in accordance with engine speed.

The temperature responsive computer section portion 74 includes temperature sensing apparatus 478 and the servo mechanism 480. Temperature sensing apparatus 478 includes a conduit 484 for conveying temperature expandable fluid from the compressor input as sensed by temperature sensing device 32 to the bellows 488. Bellows 486 is provided to cancel out the effects of fuel temperature on bellows 488. Conduit 482 is provided to cancel the effects of ambient air temperature. Mechanical linkages are provided in conjunction with bellows 486 and 488 to move lever 490 in opposite directions, as indicated by arrows 492 on variations of the sensed temperatures. Members 494 are moved axially in accordance with the temperature sensed by the bellows connected thereto to change the position of the pivotal mounting 496 of linkage member 498 and therefore the position of the pivotal connection 500 between lever 490 and linkage member 498 to cause pivoting of lever 490 about its pivotal mounting 502.

Movement of lever 490 in the directions of arrow 492 will cause pivoting of the servo valve member 504 about pivotal mounting 506 therefor to open or close valve orifice 508. Pivotal mounting 506 for valve member 504 is secured to the differential area piston 510 and the force transfer shaft 354 and guide member 512 therefor are similarly secured to the differential area piston 510 for axial movement therewith.

As before, axial movement of the differential area piston 510 is produced when, for example, the lever 490 is pivoted in a counterclockwise direction about pivot mounting 502 to pivot valve member 504 in a clockwise direction and open orifice 508 wider. Opening of orifice 508 lowers the pressure in chamber 514 due to the drop in pressure from conduit 516 across the restriction 518. Piston 510 is thus moved to the right in FIGURE 3C until the servo valve member 504 is pivoted counterclockwise sufficiently to close orifice 508 and reestablish the pressure balance on the differential area piston 510.

The axial movement of force transfer rod 354 thus produced will cause rotation of cam 332 in accordance with the sensed compressor input temperature.

In over-all operation of the computer section 64 of the fuel control 10 illustrated in FIGURE 3B the cam 32 is thus moved axially in accordance with the speed of the engine 24 as sensed by the speed sensor portion 72 of fuel control section 64 and is rotated in accordance with the compressor input air temperature as sensed by the temperature sensor portion 74 of fuel control section 64.

Depending on the setting of the speed set cam 342 and the engine speed either the acceleration lever 334 or the governor lever 336 will be in contact with the three dimensional surface of cam 332. Both levers 334 and 336 will not be in contact with the cam 332 at the same time, except during transition from acceleration to governing.

The force transfer shaft 304 will therefore be moved axially in accordance with the contour of the three dimensional surface of the governing portion 330 or acceleration portion 328 of the cam 332. When the acceleration lever 334 is in control of the axial position of the force transfer rod 304 the position of the rod 304 is dependent only on engine speed and compressor input air temperature. When the governor lever 336 is in control of the axial position of the force transfer rod 304 the axial position of the rod 304 is, in addition, determined by the angular position of the speed set cam 342.

The force transfer rod 304 repositions the member 296 to vary the distance $L_2$ between the pivot point of the lever 286 and the point of engagement of the roller 290 therewith. Thus the primary signal pressure to fuel flow ratio is adjusted by axial movement of the force transfer rod 304 while the primary fuel control is through the force applied to lever 286 through bellows 306 due to variations in compressor discharge or burner input pressure. During deceleration the fuel metering is directly proportional to compressor output or burner input pressure. However, during deceleration in contrast to acceleration fuel metering is also determined by engine parameters, such as engine speed.

Thus it will be seen that in accordance with the invention a simple fuel control having complex fuel metering capabilities is provided which includes a replaceable main fuel metering section to increase the versatility thereof and in which the computer section is substantially isolated from the main fuel metering section. In addition it will be noted that the fuel control described above includes an integral variable stroke servo fuel supply pump and is constructed to permit individual component presetting with a minimum of effort.

Figure 4:
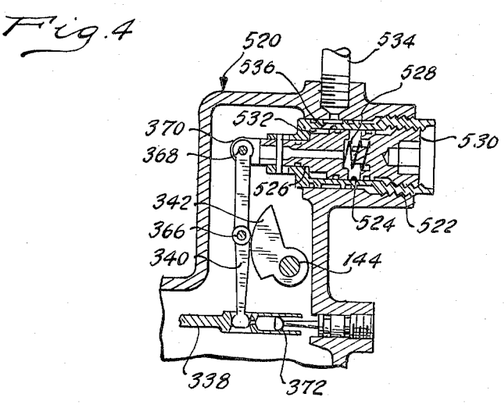
FIGURE 4 is a diagrammatic illustration of a modification of the fuel control illustrated in FIGURES 3A, 3B and 3C.

The modification of the fuel control 10 illustrated in FIGURE 4 includes apparatus 520 for further changing the signal pressure to fuel flow ratio of the fuel control during water injection to the engine 24. Since the apparatus 520 is provided as a part of the governing and acceleration portion 68 of a fuel control 10, the same numbers are used to indicate the same elements in the modified fuel control illustrated in FIGURE 4 as were used in FIGURES 3B and 3C.

As shown in FIGURE 4 the turbine overspeed adjustment member 522 is provided with a bore 524 extending axially therethrough in which piston 526 is mounted for axial reciprocation. Piston 526 is biased toward the left end of the member 522 by means of the bias spring 528 acting between the piston 526 and the adjustable plug 530 threaded into the end of the bore 524 of the member 522. The speed set cam follower lever 340 is pivotally mounted by the pivot means 368 to the end 370 of piston 526 as before.

In operation when water is injected into the engine 24 water under pressure is also injected into the annular chamber 532 formed between the piston 526 and the member 522 through conduit 534 and passages 536 in member 522. Piston 532 is thus caused to move to the right, as shown in FIGURE 4, whereby the speed set cam follower lever 340 is pivoted clockwise about cam follower 366 to change the axial position of the governor lever adjusting linkage 338 and consequently the fuel flow to signal pressure ratio of the modified fuel control in the manner previously considered.

Figure 5:
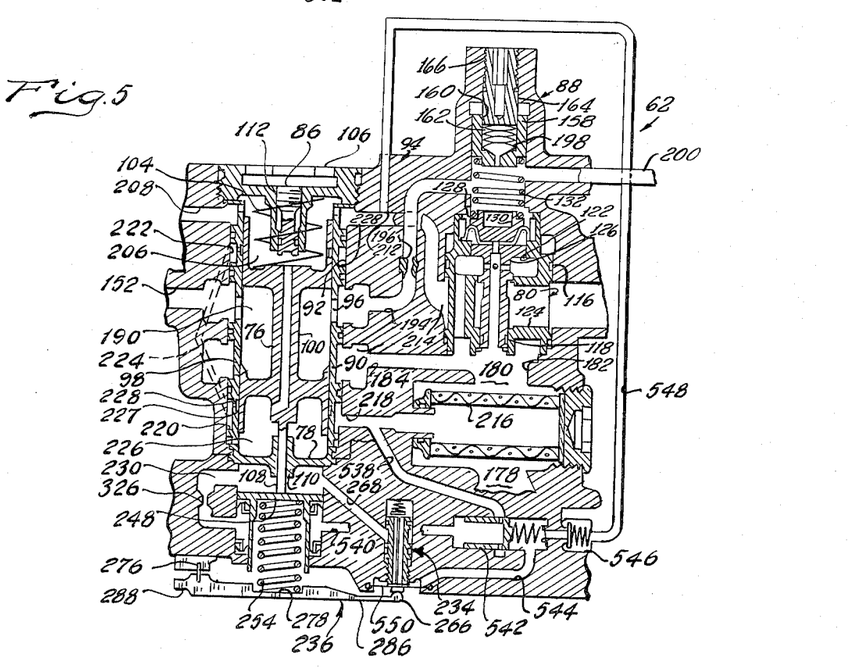
FIGURE 5 is a diagrammatic illustration of a second modification of the fuel control illustrated in FIGURES 3A, 3B and 3C.

FIGURE 5 illustrates a modification of fuel control 10 wherein part of the computer section of the modified fuel control is supplied with fuel from the main fuel pump. In the modification of the fuel control illustrated in FIGURE 5 the elements of the fuel control are given the same reference numerals as they are in the fuel control illustrated in FIGURE 3A wherein the elements are the same.

In the modified fuel control of FIGURE 5 a portion of the main fuel supply entering chamber 180 through passage 178 is filtered through the fine filter screen 216 and fed through passage 218 as before. Passage 538 is connected from passage 218 to the chamber 230 through restriction 326, passage 540 and the constant pressure valve 542. Constant pressure valve 542 serves to maintain the servo pressure supplied to passage 540 at a predetermined value, for example, one hundred twenty-five pounds per square inch above the return pressure of chamber 210.

The flow from chamber 230 is then through passage 268, servo valve assembly 234, passage 544, check valve 546 and back to the return fuel pressure through conduit 548. It will be especially noted that the diaphragm 550 is provided across servo valve assembly 234 to prevent any possible contamination of the fuel in chamber 274 with fuel in chamber 210. Also the check valve 546 is provided to prevent any possible reverse flow of fuel from chamber 210 under special conditions, such as during starting when there may be pressure surges with the fuel control 10 not filled with fuel.

Figure 6:
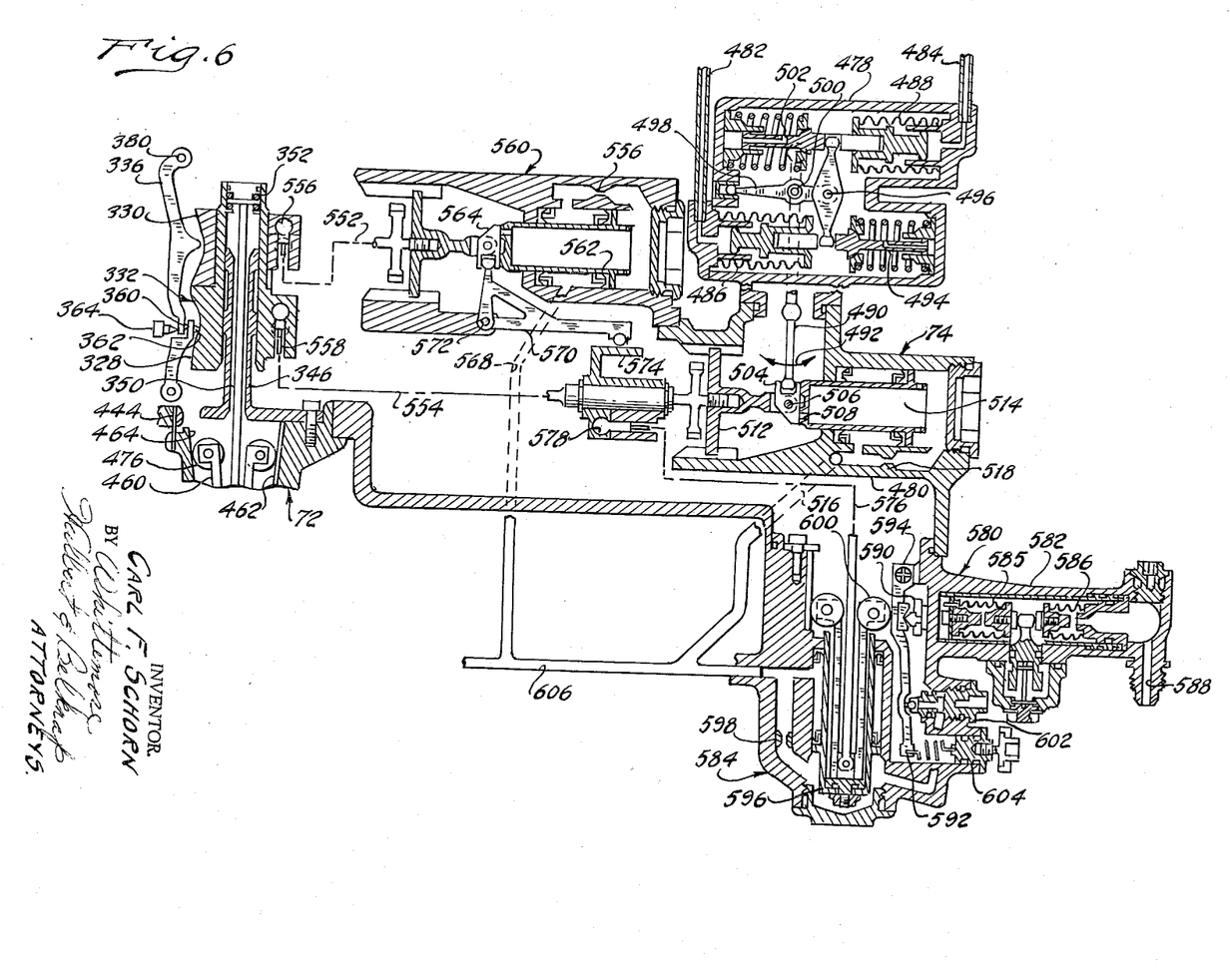
FIGURE 6 is a diagrammatic illustration of a third modification of the fuel control illustrated in FIGURES 3A, 3B and 3C.

The modification of fuel control 10 illustrated in FIGURE 6 provides separate control of the governor portion 330 of the cam 332 and the acceleration portion 328 thereof. As shown in FIGURE 6 the governor portion 330 of the cam 332 is rotated in accordance with both compressor input temperature and compressor input pressure while the acceleration portion 328 of the cam 332 is rotated only in accordance with compressor input temperature as before. Both the governor portion 330 and acceleration portion 328 of the cam 332 are moved axially in accordance with engine speed as before.

The speed responsive device 72 is the same as the speed responsive portion of the fuel control illustrated in FIGURE 3 which has been previously considered and the temperature responsive device 74 is the same as the temperature responsive portion of fuel control 10. These devices will not therefore be considered in detail in the modified fuel control of FIGURE 6. In addition similar elements in the structures of FIGURES 3B and 3C, and 6 have been given the same reference numerals.

In the structure of FIGURE 6 the portions 330 and 328 of the cam 332 are constructed separately as illustrated with the portion 330 being rotatably mounted on the portion 328 and axially movable therewith. The separate force transfer rods 552 and 554 are engageable with the separate sections 330 and 328 respectively of cam 332 through the elongated slots 556 in the cam sections and the spherical ends 558 on the rods as before. Thus on axial movement of the rods 552 and 554 the cam sections 330 and 328 will be caused to rotate independently.

Axial movement of the rod 554 is caused in exactly the same manner as axial movement of the rod 354 in FIGURE 3 due to a change in compressor input temperature as sensed by the temperature sensing device 74. The portion 328 of the cam 332 is thus rotated in accordance with compressor input temperature as before.

Axial movement of the rod 552 is produced by means of the servo mechanism 560. Servo mechanism 560 includes the differential area piston 562, valve member 564, restricting orifice 566 and the conduit 568 connecting the servo mechanism 560 to a source of constant pressure. Servo mechanism 560 is thus entirely similar to the servo mechanism by which the rod 554 is moved axially in conjunction with the temperature responsive device 74 and therefore will not be considered in further detail.

Servo mechanism 560 is caused to operate in accordance with the pivotal position of lever 570 about the pivot mounting 572 thereof. The position of the lever 570 is determined by the three dimensional cam 574 which is axially movable with the shaft 554 in accordance with the compressor input temperature and which is rotatable in accordance with compressor input pressure due to axial movement of the force transfer rod 576 in conjunction with the elongated slot 578 therein in the manner previously considered in conjunction with the cam sections 330 and 328.

Axial movement of the force transfer rod 576 in accordance with compressor input pressure is accomplished through the pressure responsive device 580. Pressure responsive device 580 includes the bellows structure 582 and servo mechanism 584.

Bellows structure 582 includes the sealed bellows 585, the bellows 586 exposed interiorly to compressor input pressure through conduit 588 and the force transfer member 590 connected between the bellows 585 and 586 to apply pressure to the lever 592 at a point remote from the pivotal mounting 594 thereof in accordance with compressor input pressure in a manner similar to the action of the bellows structure 240 in relation to the lever 286.

The servo mechanism 584 is similar to the servo mechanism 416 and includes the differential area piston 596, restricting orifice 598, lever 592 providing a variable guide surface for the biased roller 600, servo valve 602 and lever bias adjusting means 604. Again the servo mechanism 584 is connected to a source of constant pressure through conduit 606. Operation of the pressure responsive device 582 will be obvious from the foregoing and will not therefore be considered in further detail.

Thus one embodiment of the present invention and modifications thereof have been disclosed in detail. Other embodiments and modifications of the invention are contemplated. It is therefore the intention to include all embodiments and modifications as are defined by the appended claims within the scope of the invention.

What I claim as my invention is:

1. A fuel control for a turbine engine or the like having complex fuel metering capabilities comprising a fuel metering section including a fuel metering valve for regulating the fuel flow to the engine and a separate computer section secured to the fuel metering section including primary fuel metering parameter sensing means, slave means carried by the computer section and engaged with the fuel metering valve in the fuel metering section and responsive to the primary fuel metering parameter for moving the fuel metering valve to meter fuel to the engine in accordance with a predetermined metered fuel to primary fuel metering parameter value ratio comprising a servo system including a differential area slave piston, a rod positioned between and engaged with the slave piston and fuel metering valve, a servo valve, a source of fluid under constant pressure, a fluid passage from the source of fluid to one side of the differential area piston, a restricted fluid flow passage from one side to the other side of the differential area piston, an exhaust passage through the servo valve in series with the fluid passage and restricted fluid flow passage, a pivotally mounted lever operable on pivotal movement to vary the opening of the servo valve, resilient means operable between the differential area piston and the lever biasing the piston toward the main fuel metering valve, means operably associated with the primary fuel metering parameter sensing means for developing a variable force proportional to the value of the primary fuel metering parameter, means for applying the variable force to the lever including an axially movable member extending substantially parallel to the lever, a roller rotatably mounted on said axially movable member and movable along one surface of the lever on one side of the axially movable member and pressure responsive force transfer means engaged with the roller on the opposite side of the axially movable member responsive to the variable force and a plurality of other engine parameter sensing means and means engaged with and responsive to the other engine parameter sensing means for moving the axially movable member axially to vary the position of the roller along the one surface of the lever to vary the metered fuel to primary fuel metering parameter value ratio including a single three dimensional cam having governor and acceleration portions, means connected to the cam for moving the cam axially and rotating the cam in accordance with the other engine parameters sensed, pivotally mounted governor and acceleration levers alternatively engageable with said governor and acceleration portions of the cam respectively having free ends which are pivotally engaged, a pivotally mounted linkage connected at one end in a fixed position and at the other to the axially movable member and a single force transfer rod pivotally engaged with and extending between the free ends of the acceleration and governor levers and the pivotally mounted linkage.

2. Structure as set forth in claim 1 wherein the three dimensional cam is divided into separate acceleration and governor portions and the governor portion is rotatably mounted on the acceleration portion and further including means for moving the cam portions axially together in accordance with engine speed, and means for rotating the acceleration portion of the cam in accordance with compressor input temperature.

3. Structure as set forth in claim 1 wherein the three dimensional cam is divided into an acceleration portion and a governor portion rotatably mounted on the acceleration portion which portions are movable axially together and are rotatable separately and further including means for rotating the governor portion of the cam in accordance with compressor input temperature and compressor input pressure including compressor input temperature sensing means, an axially movable servo mechanism responsive thereto and a second three dimensional cam movable axially therewith in response to the compressor temperature sensing means, compressor input pressure sensing means, a servo mechanism movable in response to the compressor input pressure sensing means and connected to the second three dimensional cam for producing rotation thereof, a third servo mechanism movable in accordance with the position of the second three dimensional cam and means connecting the third servo mechanism and cam governor portion for producing rotation of the cam governor portion in accordance with the movement of the third servo mechanism.

4. Structure as set forth in claim 1 and further including means for adjusting the pivotal mounting of the governor lever comprising an axially movable governor lever, adjusting linkage to which the governor lever is pivotally connected, means biasing the adjusting linkage axially in one direction, means for moving the adjusting linkage axially in opposition to said biasing means including a cam follower lever one end of which is engaged with the governor lever adjusting linkage, a pivotal mounting for the cam follower lever at the other end thereof, a cam follower secured to the cam follower lever centrally thereof and a manually settable cam member engaged with said cam follower, a fixed cylinder in which the pivotal mounting for the cam follower is positioned and means for injecting water under pressure into the cylinder to produce a predetermined movement of the pivotal mounting for the cam follower during water injection to the engine.

References Cited by the Examiner

UNITED STATES PATENTS

| | | | |
|---|---|---|---|
| 2,720,751 | 10/1955 | Kunz | 60—39.28 |
| 2,906,093 | 9/1959 | Robinson | 60—39.28 |
| 2,926,494 | 3/1960 | Farkas | 60—39.28 |
| 3,023,801 | 3/1962 | Kinney | 60—39.28 |
| 3,029,599 | 4/1962 | Chandler | 60—39.28 |
| 3,068,648 | 12/1962 | Fleming | 60—39.28 |
| 3,072,061 | 1/1963 | Cameron | 60—39.28 |
| 3,084,510 | 4/1963 | Marscher | 60—39.28 |
| 3,095,702 | 7/1963 | Brown | 60—39.28 |
| 3,103,829 | 9/1963 | Basford | 60—39.28 |

(Other references on following page)

UNITED STATES PATENTS

| | | | |
|---|---|---|---|
| 3,108,435 | 10/1963 | Chandler | 60—39.28 |
| 3,129,643 | 4/1964 | Porter | 60—39.16 X |
| 3,139,727 | 7/1964 | Torell | 60—39.28 |
| 3,142,154 | 7/1964 | Leeson | 60—39.28 |

FOREIGN PATENTS 220,301 Australia.

JULIUS E. WEST, *Primary Examiner.*

SAMUEL LEVINE, *Examiner.*